United States Patent [19]
Spencer

[11] 3,797,754
[45] Mar. 19, 1974

[54] CONTINUOUS TUBE TRICKLE IRRIGATION

[76] Inventor: Lloyd Spencer, 220 Patrician Way, Pasadena, Calif. 91105

[22] Filed: June 21, 1973

[21] Appl. No.: 372,318

Related U.S. Application Data

[63] Continuation-in-part of Ser. No. 274,078, July 21, 1972.

[52] U.S. Cl. .................. 239/542, 137/217, 239/111
[51] Int. Cl. ............................................. B05b 15/00
[58] Field of Search .......... 239/110, 111, 542, 547, 239/541, 602; 137/217

[56] References Cited
UNITED STATES PATENTS

| | | | |
|---|---|---|---|
| 2,705,662 | 4/1955 | Leonard, Jr. | 239/110 |
| 3,685,735 | 8/1972 | Foster | 239/542 X |
| 3,693,888 | 9/1972 | Rondas | 239/547 X |
| 3,698,195 | 10/1972 | Chapin | 239/542 X |
| 3,567,134 | 3/1971 | Smith | 239/547 |

*Primary Examiner*—M. Henson Wood, Jr.
*Assistant Examiner*—Michael Y. Mar

[57] ABSTRACT

A continuous tube trickle irrigator including a tubular member having longitudinally extending membrane forming with the surrounding tubular member a main flow passage and a flush flow passage, the membrane having a series of longitudinally spaced inlet openings communicating between the main flow passage and the flush flow passage, and the tubular member having a series of outlet openings longitudinally offset from the inlet openings, to form between the openings a series of self flushing emitters which permit flush flow when the pressure in the main passage is below a predetermined minimum value, the membrane being collapsible in the vicinity of each outlet opening above such minimum pressure to form with the tubular member a series of trickle passages.

20 Claims, 27 Drawing Figures

PATENTED MAR 19 1974 3,797,754

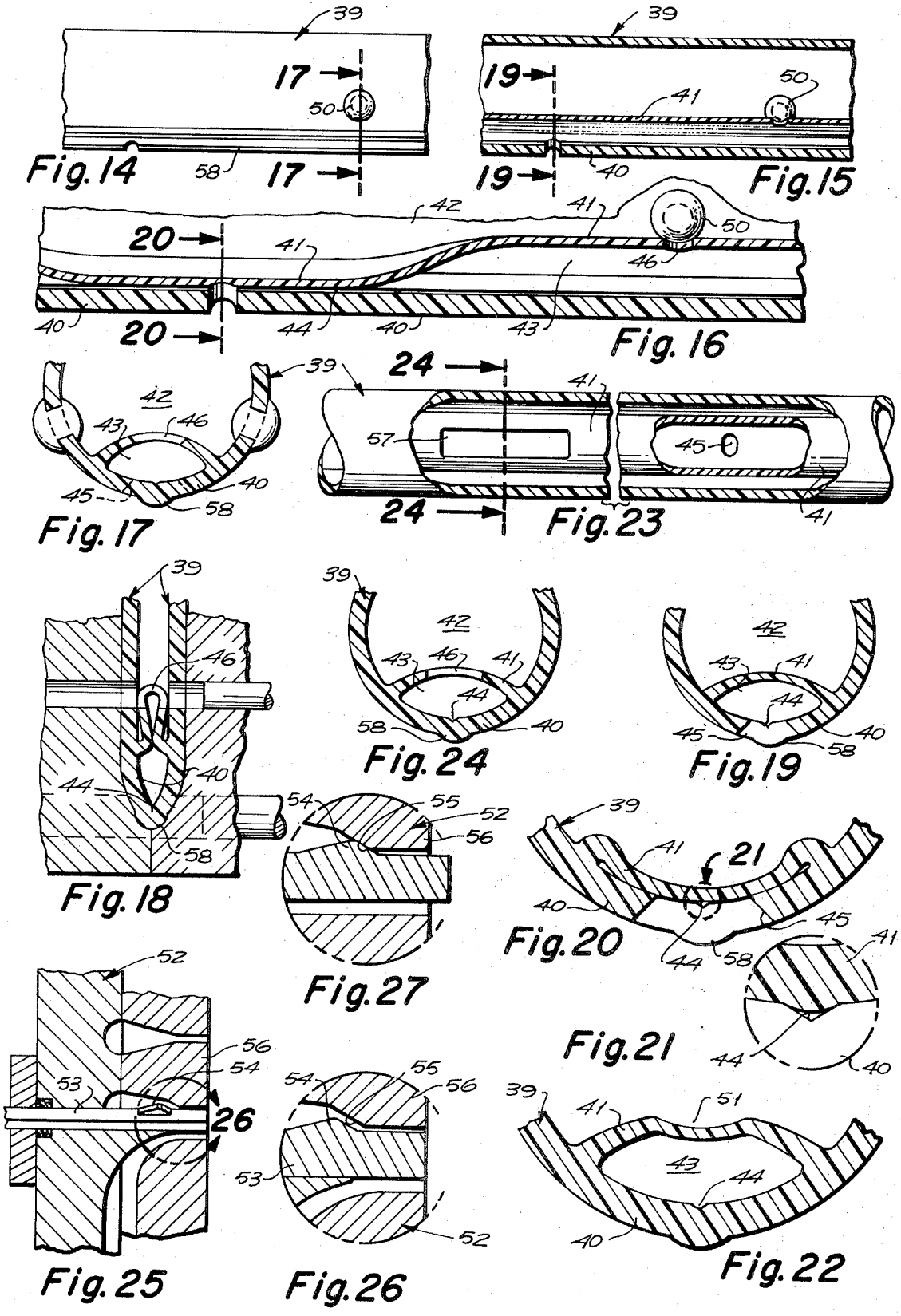

CONTINUOUS TUBE TRICKLE IRRIGATION

This application is a continuation-in-part of my co-pending application, Ser. No. 274,078; filed July 21, 1972; for TRICKLE IRRIGATION SYSTEM. Also it is related to my copending application, Ser. No. 245,312; filed Apr. 19, 1972; for SELF-FLUSHING IRRIGATING VALVE.

BACKGROUND OF THE INVENTION

Drip or trickle irrigation is a rapidly developing type of irrigation in which the water is discharged at a fraction of or only a few gallons per hour from a multitude of outlets. The reduction in quantity of water required is substantial and is accompanied by materially increased crop yield with minimum cultivation. In general two systems are in use, one involves individual emitters incorporated in fittings attached to a flow line. Embodiments of this type of emitter are shown in the aforementioned copending applications. The other system involves continuous tubing having spaced minute perforations, or continuous tubing having porous walls. In order to minimize clogging of the minute openings or pores of conventional continuous tubing emitters, extremely expensive filtration is required.

SUMMARY OF THE INVENTION

The present invention is directed to a continuous tube trickle irrigator which is summarized in the following objects:

First, to provide a continuous tube trickle irrigator which incorporates a series of emitters, each of which is self-flushing; that is, below a predetermined low pressure the emitters form flush passages dimensioned to pass particulate matter as large as a sixteenth or eighth of an inch, then at a higher pressure the emitters collapse to form minute passages capable of reducing the flow to a predetermined rate in the range between a fraction of a gallon and 2 or 3 gallons per hour as desired.

Second to provide a continuous tube trickle irrigator wherein the emitters tend, under drip or trickle flow conditions, to provide constant flow; that is, the line pressure may vary substantially without change in flow rate.

Third, to provide a continuous tube trickle irrigator which is particularly suited for row crops, and is adapted to be placed on the surface of the ground or buried prior to or in the course of planting the crop; then may be removed during or after harvest to permit cultivation in preparation for a succeeding crop; then repeatedly reused for succeeding crops with minimal servicing of the continuous tube irrigator. Fourth, to provide an extruded continuous tube trickle irrigator which, after extrusion, may be perforated to space the outlets in conformity with crop spacing and which may be arranged to provide a pair of inlets communicating with a single outlet to minimize the chance that an emitter outlet will be closed during an irrigation cycle.

Fifth, to provide an extruded continuous tube trickle irrigator, an embodiment of which is capable of being flattened to minimize storage space and to permit wrapping in a common plane to facilitate handling in conjunction with planting and harvesting operations; the membrane which separates the main and flush passages, having a connection with the surrounding walls through a web element which maintains the membrane in an undamaged condition when the tube is flattened and insures the needed movement of the membrane between its positions which permit flush and drip flow.

Sixth, to provide an extruded continuous tube trickle irrigator which may be formed in an open condition to provide direct access for perforating the membrane to form the inlet openings, the tube then being closed and sealed.

Seventh, to provide a continuous tube trickle irrigator, an embodiment of which is extruded in tubular form, the membrane being perforated at the extrusion die as the tube is extruded therefrom.

Eighth, to provide a continuous tube trickle irrigator, another embodiment of which is extruded in tubular form, all perforations being formed subsequent to extrusion, the membrane being perforated by a tool which penetrates the outer tube forming holes therein which are later closed.

DESCRIPTION OF THE FIGURES

FIG. 14 is a fragmentary side view showing a further embodiment of the continuous tube trickle irrigator.

FIG. 15 is a fragmentary longitudinal sectional view thereof showing the irrigator in its flush condition.

FIG. 16 is an enlarged fragmentary longitudinal sectional view thereof showing the irrigator in its drip condition.

FIG. 17 is an enlarged fragmentary transverse sectional view thereof taken through 17—17 of FIG. 1 showing the irrigator in its flush condition.

FIG. 18 is an enlarged fragmentary transverse sectional view taken in the same plane as FIG. 17, and indicating fragmentarily a means for forming openings in the irrigator.

FIG. 19 is an enlarged fragmentary transverse sectional view taken through 19—19 of FIG. 15 showing an outlet opening subject to a flush condition.

FIG. 20 is a further enlarged transverse sectional view taken through 20—20 of FIG. 16 showing an outlet opening subject to a drip condition.

FIG. 21 is a further enlarged view taken within circle 21 of FIG. 20 indicating the manner in which the drip or trickle passage is reduced with increased pressure to effect essentially constant flow under drip or trickle condition.

FIG. 22 in an enlarged secional view showing a modified membrane.

FIG. 23 is a fragmentary longitudinal view with portions in section which is essentially the same as the embodiment shown in FIGS. 14 through 21 but illustrating a modified inlet opening.

FIG. 24 is a fragmentary transverse sectional view thereof taken through 24—24 of FIG. 23.

FIG. 25 is a fragmentary sectional view of an extrusion die equipped to form inlet openings as the irrigator is extruded.

FIG. 26 is an enlarged sectional view taken within circle 26 of FIG. 25 showing the die in its normal condition in which the full membrane is formed.

FIG. 27 is a corresponding sectional view showing the die in its condition to form an inlet opening in the membrane.

SPECIFICATION

Figure 1:
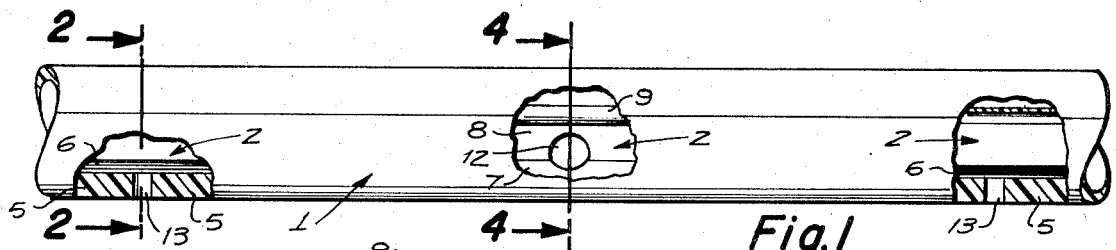
FIG. 1 is a fragmentary side view with portions in section showing one embodiment of the continuous tube trickle irrigator, the irrigator being shown in flush condition.
Figures 2, 3, 4, 5:
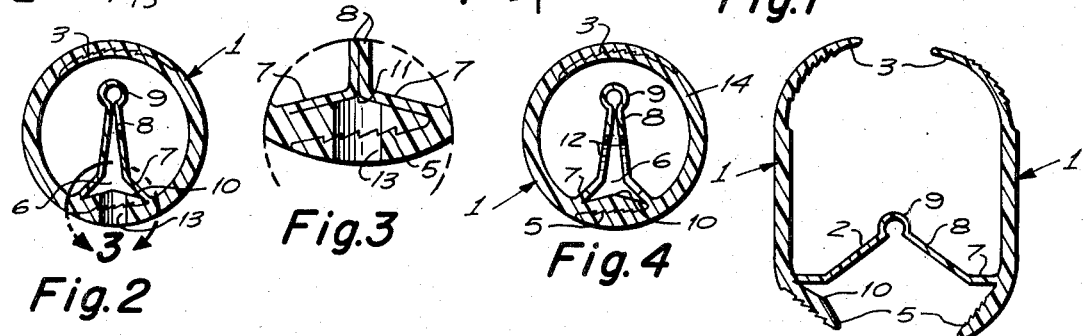
FIG. 2 is an enlarged transverse sectional view thereof taken through 2—2 of FIG. 1, showing an outlet opening under flush condition.
FIG. 3 is a further enlarged sectional view taken within circle 3 of FIG. 2 and showing an outlet when the irrigator is in its drip condition.
FIG. 4 is an enlarged transverse sectional view thereof taken through 4—4 of FIG. 1, showing an inlet opening.
FIG. 5 is a transverse sectional view of the embodiment shown in FIGS. 1 through 4 essentially as it appears when extruded.
Figure 6:
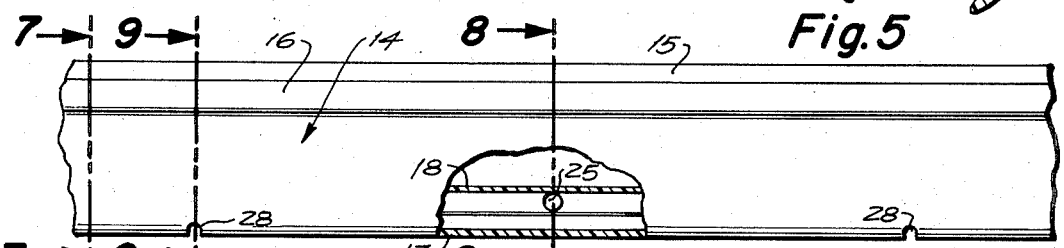
FIG. 6 is a fragmentary side view, with portions in section showing another embodiment of the continuous tube trickle irrigator in a flattened condition.

Reference is first directed to the embodiment of the continuous tube trickle irrigator shown in FIGS. 1 through 5. The irrigator is formed of an extrudable plastic material which preferably has elastomeric properties, and a "MEMORY"; that is, if deformed it readily returns to its previous shape when the deforming force is removed. Referring first to FIG. 5, the irrigator, as extruded, includes a complementary pair of outer wall components 1 connected by a membrane 2. The components 1 are provided with a first pair of mating margins 3 which are curved, tapered and have mutually engageable ribs. These margins define portions of a main passage 4 when cemented together. The components are also provided with a second pair of mating margins 5 which are tapered and have mutually engaging ribs. The margins 5 become portions of a flush passage 6.

When the components 1 are joined as shown in FIGS. 1, 2 and 4, they form an essentially circular outer wall of the irrigator, and the membrane 2 folds. The membrane includes marginal portions 7 joined to the components 1 which, when the components are joined, converge inwardly and angularly connect to central portions 8, which, in turn are joined by a loop portion 9. The wall surface formed by the inwardly exposed surface 10 of the inner mating margin 5 forms an obtuse V. The marginal portions 7 of the membrane 2 normally diverge inwardly therefrom. The width of the marginal portions 7 are such that their intersections with the central portions 8 meet when the marginal portions 7 fold against the apex obtuse surface 10 and form a trickle passage 11.

Before the extrusion is formed into a tube, the membrane is pierced at selected intervals to form inlet openings 12 which encompass the junctures between the marginal portions 7 and central portions 8. Also the margins 5 are pierced with mating holes which become outlet openings 13.

Operation of the embodiment of the continuous tube trickle irrigator shown in FIGS. 1 through 5 is as follows:

The membrane 2 tends to assume the shape shown in FIGS. 2 and 4. Assuming that the diameter of the irrigator is approximately ¾ inch in diameter, the flush passage 6 may be dimensioned to clear particles of ⅛ inch diameter. Outlet openings 13 of ⅛ inch diameter are adequate. It is preferred that the inlet openings be slightly larger; in fact as indicated with respect to other embodiments the inlet openings may be substantially larger. The thickness of the membrane 2 and the physical properties of the material are selected so that as water is supplied to the irrigator and its pressure increases, the side portions 7 collapse when the differential pressure across the membrane is in the order of two to ten pounds. As will be indicated more fully in connection with a subsequent embodiment, the highest pressure differential occurs in the vicinity of each outlet opening.

On initiation of an irrigation cycle flush flow occurs during initial introduction of water; and on termination of the irrigation cycle, flush flow occurs just prior to completion of drainage.

During the irrigation cycle, when the membrane 2 is collapsed to form the trickle passage 11, flow from each outlet opening is predetermined by the properties of the material comprising the membrane, its wall thickness, and the contours of confronting parts of the membrane 2 and the surface 7 at its apex. A trickle or drip flow in the order of one gallon per hour or less or in the order to two or three gallons per hour may be obtained. Furthermore, once such flow has been established, the confronting parts of the trickle passage 7 formed by the membrane have the properties of a constant flow valve; that is, a substantly constant flow may be obtained although the line pressure may vary from, for example, in a range between twenty and sixty pounds.

Reference is now directed to the embodiment shown in FIGS. 6 through 12. The embodiment here illustrated is an extrusion of plastic material, which includes a main wall forming component 14 having diverging sides and a connecting wall component 15. These components terminate in mating closure elements 16, the configuration of which is similar to the conventional continuous closure elements formed on confronting margins of plastic bags and which mechanically interlock but are capable of separation. The diverging sides of the main wall component 14 are joined by an arcuate portion 17 which confronts an arcuate membrane 18 forming therewith a flush passage 19. The connecting wall component 15 is attached to the membrane 18 and a web 20. A trickle passage channel 21 is formed along the midportion of arcuate portion 17.

Upon extrusion, the wall components 14 and 15 are temporarily joined by the closure components 16 and flattened so as to be rolled upon a reel for storage. Internal ribs 22 may be provided so that the tube is essentially flat as indicated in FIG. 7.

Figures 11, 12:
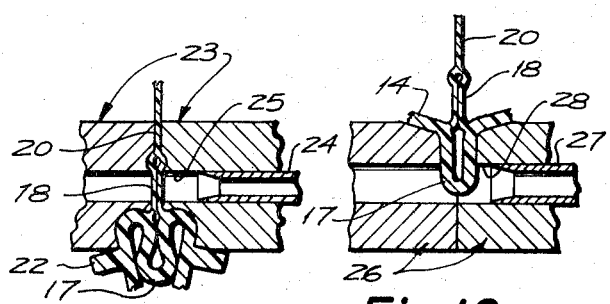
FIG. 11 is an enlarged fragmentary view illustrating a manner in which inlet openings may be formed.
FIG. 12 is another enlarged fragmentary view illustrating a manner in which an outlet opening may be formed

In order to provide the necessary openings, the flattened tubular structure is reopened and folded as indicated in FIG. 11 and held by a clamp 23 so that a punch 24 may form inlet openings 25. Similarly, the structure is folded as indicated in FIG. 12 and held by a clamp 26 so that a punch 27 may form outlet openings 28. In a similar manner perforations 29 may be provided in the web 20. The structure is again closed, this time a suitable adhesive, not shown, is applied to permanently seal the closure elements 16.

Figures 7, 8, 9, 13:
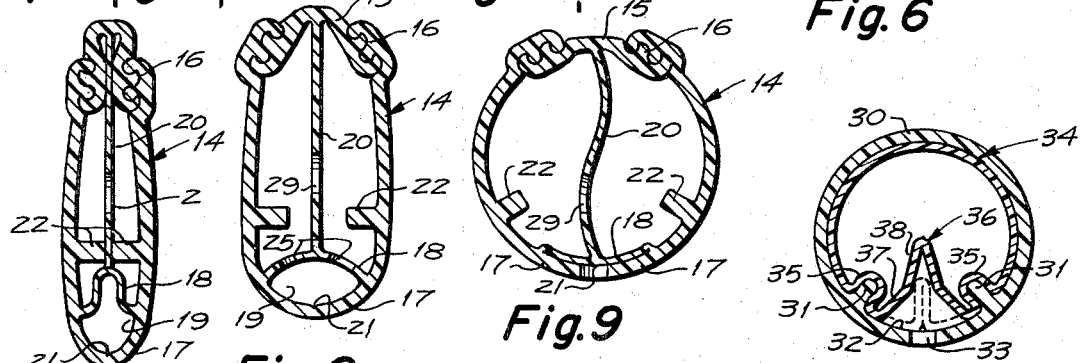
FIG. 7 is an enlarged transverse sectional view thereof taken through 7—7 of FIG. 6, also showing the irrigator in its flattened condition.
FIG. 8 is an enlarged transverse sectional view thereof taken through 8—8 of FIG. 6 with the irrigator shown in its flush condition.
FIG. 9 is an enlarged transverse sectional view thereof taken through 9—9 of FIG. 6 with the irrigator shown in its drip or trickle condition.
FIG. 13 is a typical transverse sectional view showing a further embodiment of the continuous tube trickle irrigator.
Figure 10:
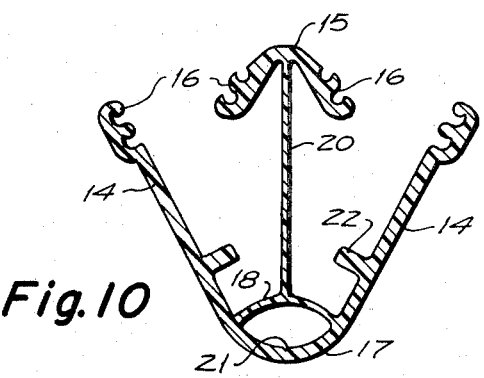
FIG. 10 is an enlarged typical transverse sectional view thereof, showing the irrigator as extruded.

Operation of the embodiment of the continuous tube trickle irrigator shown in FIGS. 6 through 12 is as follows:

When in storage the shape of the irrigator is essentially as shown in FIG. 7. When installed and empty its shape may be between that shown in FIGS. 7 and 8. During initial entry of water and during the final drainage stage the configuration is essentially as shown in FIG. 8. In this condition, the web 20 holds the membrane 18 in position to form the flush passage 19. During irrigation, the irrigator assumes a circular shape as shown in FIG. 9. In this condition the web 20 is slack permitting the membrane 20 to close against the arcuate portion 17 except for the trickle channel 21. At some pressure below irrigation pressure during transition between the shapes shown in FIGS. 8 and 9, the web 20 permits the membrane 20 to snap toward or away from the arcuate portion 17.

Reference is directed to the embodiment of the continuous tube trickle irrigator shown in FIG. 13. The embodiment here illustrated includes an extruded outer tube 30 which may be relatively rigid, and having a pair of internal ribs 31 defining therebetween an arcuate portion 32 having a series of centrally located outlet openings 33.

The outer tube 30 receives an extruded inner tube 34 formed of relatively soft material such as rubber or an appropriate plastic elastomer. The inner tube is provided with channel portions 35 which conform to the ribs 31 to prevent circumferential displacement. Between the channel portions 35 is a membrane 36 having marginal portions 37 which converge toward each other and diverge from the arcuate portion 32 to form a flush passage 38. The confronting edges of the marginal portions 37 are acutely joined to converging inner portions 38 which join together to form an apex.

The outer tube 30 is of such length that the inner tube 34 may be pulled therein. Prior to assembly, the membrane 36 is perforated at intervals to form inlet openings, not shown, spaced so as to be longitudinally offset from the outlet openings 33.

During flush conditions the membrane 36 assumes the shape shown by solid lines. During trickle consition, the membrane assumes the shape shown by dotted lines.

Reference is directed to the embodiment of the continuous tube trickle irrigator illustrated in FIGS. 14 through 21. The construction here illustrated is extruded to form a tube 39 a portion 40 of which is bridged internally by membrane 41 to divide the tube into a main flow passage 42 and flush flow passage 43. The portion 40 of the tube 21 confronting the membrane 41 or the membrane itself is provided with a central trickle channel 44, intersected by or confronted by longitudinally spaced outlet openings 45. The membrane 40 is provided with inlet openings 46 longitudinally offset from the openings 45.

In order to form the openings 45 and 46, the tube 39 is flattened as shown in FIG. 18 by a pair of clamp structures 47 so as to fold the membrane 40 in position to be perforated by a punch 48 forced through the walls of the tube. Simultaneously in longitudinally offset relation the opening 45, the folded portion 40 is pierced by a punch 49. In place of punches 48 and 49 drills may be used, or the holes may be formed by laser beams. Subsequently the holes formed in the tube 39 may be closed by plugs 50, preferably molded in place and bonded to the tube 39. The membrane 41 has less radius and subtends a greater arc than the confronting tube portion 40 so as to be of greater width than the portion 40 permitting its lateral margins to fold and permitting the central portion of the membrane to conform with the portion 40 to close the trickle channel 44 as shown in FIG. 20. As pressure in the main passage 42 increases during drip condition, the membrane 41 presses into the channel as indicated in FIG. 21 to reduce the area of the trickle passage and maintain an essentially constant flow.

It is essential that the membrane 41 have "memory"; that is, the membrane must spring back to open the flush flow passage 43 as line pressure is reduced. This movement is enhanced by contouring the membrane so that it is thickest at its side margins to increase restoring stress; and thinest at its central portion to reduce the pressure required to initiate collapse of the arc formed by the membrane 41 and to close the trickle channel 44. To further reduce collapsing force, the central portion of the membrane 41 may have a reverse curvature as indicated by 51 in FIG. 22.

To avoid forming holes in the tube 39 and subsequent need to close by use of plugs 50, an extrusion die 52 as shown fragmentarily in FIGS. 25, 26 and 27 may be used. The extrusion die is conventional except that the flush passage is formed by a slidable core 53 accessible from the back side of the die. A closure boss 54 positioned in the region of the core 53 which forms the membrane 41. When the core is retracted as shown in FIGS. 25 and 26 it clears a seat 55 formed on the main core 56 of the die so that the entire membrane may be formed. When the core 53 is moved forward, as indicated in FIG. 27, flow in the central portion is closed off resulting in an inlet opening 57 as shown in FIGS. 23 and 24.

Because of the normally rapid movement of the extrusion die, the opening 57 is relatively long and tends to be ragged; however, this is not harmful.

Collapse of the membranes shown in the various embodiments does not occur throughout the irrigator tube but tends to be confined to each outlet opening and a region extending a short distance at either side thereof, as indicated in FIG. 16. This is due to the fact that the outflowing water creates a maximum pressure differential in this region. The remaining portions of the membrane are maintained in flush condition as the rate of drip or trickle discharge is too slow to create a significant pressure differential in the remaining portions.

It is preferred that the inlet openings be more numerous or larger than the outlet openings as this tends to ensure drip or trickle flow regions of constant length and hence of equal output regardless of the inlet-outlet spacing and permits the outlet spacing to be arranged to meet the reguirements of various crops. For example, a row crop such as carrots may require a spacing of 6 inches or less. Lettuce may require a 12 inch spacing Tomatoes may require an 18 inch spacing. Also some plants, such as trees, may require a group of closely spaced outlets and increased spacing between groups.

With equal spacing between inlets and outlets, each outlet is served by two inlets and each inlet supplies two outlets. By providing a relatively close grouping between an inlet and a pair of outlets at opposite sides thereof, each group may be formed as a unit in a single secondary operation after extrusion, as suggested in FIG. 18.

With regard to the embodiments shown in FIGS. 1 through 12, the secondary operations to form the inlet and outlet openings are performed before the tubing structure is closed. With regard to the embodiment and its modification shown in FIGS. 13 through 22, the tubing structure is closed; therefore it is necessary to orient the tubular structure circumferentially. This may be done by a longitudinal marking. Preferably a small external rib or boss 58 located conveniently in the region of the trickle channel 44 may be used and arranged for automatic sensing. Similarly, if the inlet opening such as the inlet opening 57 is formed at the die, suitable means located at the die to produce an external mark, such as by interupting the rib or boss 58 or applying an identifying color spot.

While in each embodiment the material comprising the tubular member and the membrane is the same, it is possible by use of a conventional, but more expensive, dual extrusion die to form the membrane of, for example, a softer, more flexible material than the tubular member and extrude the membrane simultaneously with the tubular member; providing, of course, that the materials comprising the tubular member and membrane are compatible.

Having fully described my invention, it is to be understood that I am not to be limited to the details herein set forth, but that my invention is of the full scope of the appended claims.

I claim:

1. A continuous tube trickle irrigator, comprising:
  a. an elongated tubular member;
  b. an elongated membrane dividing the tubular member longitudinally to form a main flow passage and a flush flow passage;
  c. a series of longitudinally spaced inlet openings piercing the membrane for communication between the main flow passage and flush flow passage;
  d. a series of outlet openings, longitudinally offset from the inlet openings, piercing the segment of the tubular member forming a wall of the flush flow passage, the inlet and outlet openings dividing the flush flow passage into a series of separate flush flow passages;
  e. The flexible membrane including marginal wall portions biased to diverge from said segment of the tubular member, whereby, when the main flow passage is subjected to water pressure below a predetermined valve, the flush flow passages are maintained open for flush flow of water therethrough;
  f. the flexible membrane being responsive to water pressure in the main flow passage to engage said segment of the tubular member and close the flush flow passages; and
  g. portions of said membrane and segment defining therebetween, on closing of the flush flow passages, a series of trickle flow passages discharging at the outlet openings.

2. A trickle irrigator as defined in claim 1, wherein:
  a. the flexible membrane further includes a pair of foldably connected central wall portions and foldable junctures joining the central wall portions to the marginal wall portions;
  b. the marginal wall portions being foldable against the said segment of the tubular member, and the central wall portions being foldable into mutual engagement, thereby to cause the folded junctures to form said trickle passages with said segment of the tubular member.

3. A trickle irrigator as defined in claim 1, wherein:
  a. the membrane is a section of a liner including a complementary section covering the walls of the main flow passage;
  b. the liner is axially slidable into the tubular member;
  c. and means is provided to orient the liner circumferentially thereby to position the outlet openings in communication with the flush flow passages.

4. A trickle irrigator as defined in claim 1, wherein:
  a. the flexible member is an arch segment including the marginal wall portions curving in the opposite direction from the confronting segment, the arch segment being collapsible into contact with the said segment of the tubular member;
  b. one of the segments having a groove therein forming a wall of the trickle passage when the segments are in mutual contact.

5. A trickle irrigator as defined in claim 4, wherein:
  a. the arch segment includes a central portion arching in the opposite direction to reduce the force required to collapse the arch segment.

6. A trickle irrigator as defined in claim 1, wherein:
  a. a wall of each trickle passage is responsive to increased pressure to reduce the area of the trickle passage whereby the flow in the trickle passages tend to remain constant throughout a range of pressures in the main flow passage.

7. A trickle irrigator as defined in claim 1, wherein:
  a. the tubular member and membrane are portions of a common extrusion and the inlet openings in the membrane are formed during extrusion.

8. A trickle irrigator as defined in claim 1, wherein:
  a. the tubular member and membrane are portions of a common extrusion, perforations are formed in the tubular member simultaneously with forming the inlet openings, and plug elements are provided to close the perforations.

9. A trickle irrigator as defined in claim 1, wherein:
  a. the tubular member is initially formed of complementary longitudinally extending portions having interengaging margins for closing the tubular member, thereby to permit forming the inlet and outlet openings prior to closure of the tubing.

10. A trickle irrigator as defined in claim 1, wherein:

a. the membrane is joined by a flexible web to a diametrically opposed portion of the tubular member;

b. the tubular member is adapted to be flattened when not in use, assume an essentially oval shape when filled with water at low pressure, and assume an essentially circular shape when pressurized;

c. the web retains the membrane in a condition permitting flush flow when the tubular member is flattened as well as when filled with water at low pressure, and permits collapse of the membrane to cause trickle flow when the pressure in the main flow passages exceeds a predetermined value.

11. A continuous tube trickle irrigator, comprising:

a. an elongated tubular member;

b. a series of self flushing emitter units disposed along and within the tubular member;

c. each emitter including a fixed wall forming a portion of the tubular member and a confronting flexible wall joined at it's circumferential margins to the fixed wall; an outlet port in the fixed wall, and an axially offset inlet port in the flexible wall;

d. the flexible wall normally biased away from the fixed wall to form a flush passage between the inlet and outlet ports and responsive to a predetermined pressure differential between the pressure within the tubular member and the region within the flush passage adjacent the outlet port to collapse against the fixed wall and form therewith a trickle passage in said region.

12. A trickle irrigator as defined in claim 11, wherein:

a. a pair of inlet ports are disposed axially beyond opposite sides of the outlet port forming therewith a pair of flush passages and a pair of trickle passages.

13. A trickle irrigator as defined in claim 11, wherein:

a. each flexible wall includes foldable sections, the fixed wall includes fixed obtusely related sections, and the trickle passage is formed at the juncture of said sections.

14. A trickle irrigator as defined in claim 11, wherein:

a. each flexible wall and fixed wall, when forming a flush passage, define arches curving in opposite directions, and when forming the trickle passage the flexible wall conforms to the fixed wall, there being a trickle channel in one of the walls.

15. A trickle irrigator as defined in claim 11, wherein:

a. a portion of the boundary of the trickle passage is yieldable to increased pressure in the tubular member to further restrict the trickle passage thereby tending to maintain constant flow through a range of pressures.

16. A trickle irrigator as defined in claim 11, wherein:

a. the tubular member is an extrusion initially comprising segments having peripheral margins including means for mutual interlocking and sealing attachment, thereby permitting access to form the ports.

17. A trickle irrigator as defined in claim 16, wherein:

a. the walls of the tubular member are flexible to permit flattening for storage, to assume an essentially oval shape when filled with water at a pressure sufficiently low to cause formation of flush passages, and to assume an essentially circular shape at higher pressures sufficient to cause formation of trickle passages;

b. and a web is attached to the flexible wall and the tubular member for controlling the position of the flexible wall in response to change in shape of the tubular member.

18. A trickle irrigator as defined in claim 11, wherein:

a. the tubular member is compressible to press the flexible wall between opposite portions of the tubular member for piercing the flexible wall and overlying portions of the tubular member simultaneously, and plug means for subsequently closing the holes pierced in the tubular member.

19. An irrigation line for trickle irrigation systems, comprising:

a. a tubular member;

b. a flexible membrane joined at its lateral margins to the inner surface of the tubular member to define with a confronting segment of the tubular member an axially extending flow passage;

c. inlet openings provided in the membrane in spaced axial relation;

d. outlet openings provided in the confronting segment of the tube member in axially spaced relation to the inlet openings;

e. the flexible membrane including marginal wall portions biased to diverge from the confronting segment of the tubing member, whereby, when the tubular member is subjected to water pressure below a predetermined value, the membrane and confronting segment form longitudinal water flushing passages between the inlet and outlet openings;

f. the flexible membrane being deflectable by water pressure above said predetermined pressure into engagement with the confronting segment;

g. and means forming reduced trickle flow passages between the inlet and outlet openings upon deflection of the membrane into engagement with the confronting segment.

20. A trickle irrigation line as defined in claim 19, wherein:

a. the flexible membrane further includes a pair of foldably connected central wall portions and foldable junctures joining the central wall portions to the marginal wall portions;

b. the marginal wall portions being foldable against the confronting segment, and the central wall portions being foldable into mutual engagement; thereby to cause the junctures to form trickle passage with the opposing portion of the confronting segment.

* * * * *